United States Patent
Dahan et al.

(10) Patent No.: US 7,587,525 B2
(45) Date of Patent: Sep. 8, 2009

(54) POWER CONTROL WITH STANDBY, WAIT, IDLE, AND WAKEUP SIGNALS

(75) Inventors: Franck Dahan, Nice (FR); Franck Seigneret, Saint-Jeannet (FR); Gilles Dubost, Valbonne (FR)

(73) Assignee: Texas Instruments Incorporated, Dallas, TX (US)

( * ) Notice: Subject to any disclaimer, the term of this patent is extended or adjusted under 35 U.S.C. 154(b) by 180 days.

(21) Appl. No.: 11/383,416

(22) Filed: May 15, 2006

(65) Prior Publication Data
US 2007/0130383 A1    Jun. 7, 2007

(30) Foreign Application Priority Data
Nov. 14, 2005  (EP) .................................. 05292417

(51) Int. Cl.
*G06F 13/28*  (2006.01)
*G06F 1/26*   (2006.01)
(52) U.S. Cl. ........................................ 710/22; 713/320
(58) Field of Classification Search ................... 710/22; 713/300, 310, 320, 322, 323, 324
See application file for complete search history.

(56) References Cited

U.S. PATENT DOCUMENTS

| | | | |
|---|---|---|---|
| 5,461,266 A * | 10/1995 | Koreeda et al. ............. | 307/125 |
| 5,493,684 A * | 2/1996 | Gephardt et al. ............ | 713/322 |
| 5,910,930 A | 6/1999 | Dieffenderfer et al. | |
| 5,925,133 A | 7/1999 | Buxton et al. | |
| 6,073,244 A * | 6/2000 | Iwazaki ....................... | 713/322 |
| 6,148,345 A | 11/2000 | Yamaki | |
| 6,243,831 B1 * | 6/2001 | Mustafa et al. ................ | 714/24 |
| 7,149,692 B1 * | 12/2006 | Wu ............................. | 704/270 |
| 2003/0115428 A1 * | 6/2003 | Zaccarin et al. ............. | 711/156 |
| 2003/0163742 A1 * | 8/2003 | Lam ............................ | 713/300 |
| 2007/0109292 A1 * | 5/2007 | Dahan et al. ................. | 345/211 |
| 2007/0113111 A1 * | 5/2007 | Dahan et al. ................. | 713/300 |
| 2007/0130482 A1 * | 6/2007 | Dahan et al. ................. | 713/300 |

FOREIGN PATENT DOCUMENTS

EP           0 208 287 A        1/1987

\* cited by examiner

*Primary Examiner*—Henry W. H. Tsai
*Assistant Examiner*—Hyun Nam
(74) *Attorney, Agent, or Firm*—Lawrence J. Bassuk; W. James Brady; Frederick J. Telecky, Jr.

(57) ABSTRACT

An apparatus and method for conserving power in a memory information transfer system. The system may include a direct memory access (DMA) controller coupled to a memory storage device and a peripheral device. The DMA controller transfers information from the memory storage device to a buffer in the peripheral device. The DMA controller may also transfer information from the buffer in the peripheral device to the memory storage device. When the peripheral device buffer does not have to be filled or emptied by the DMA controller, the DMA controller enters a standby mode. When the peripheral device buffer is full or empty, the DMA controller exits standby mode, empties or fills the peripheral device buffer, and reenters standby mode.

16 Claims, 2 Drawing Sheets

POWER CONTROL WITH STANDBY, WAIT, IDLE, AND WAKEUP SIGNALS

This application claims priority under 35 USC 119(e)(1) of European Application Number 05292417.2, filed on Nov. 14, 2005.

CROSS REFERENCE TO RELATED APPLICATIONS

This application is related to the following co-pending applications: U.S. patent application Ser. No. 11/559,388 entitled "STANDBY MODE FOR POWER MANAGEMENT" filed Nov. 13, 2005; U.S. patent application Ser. No. 11/559,387 entitled "IDLE MODE FOR POWER MANAGEMENT" filed Nov. 13, 2005; and U.S. patent application Ser. No. 11/559,386, entitled "DISPLAY POWER MANAGEMENT" filed Nov. 13, 2005.

FIELD OF THE INVENTION

The present invention generally relates to power management during information transfer in a memory system. More particularly, the invention relates to power management in a direct memory access (DMA) system. Still more particularly, the invention relates to power management in a DMA system through the control of power and clock signals.

BACKGROUND OF THE INVENTION

Direct memory access (DMA) uses a DMA controller to transfer information between components in an electronic device. In a device without DMA capability, a processor may transfer information between components. By implementing a DMA system, the task of transferring information between components of the electronic device shifts from the processor to the DMA controller, thus allowing the processor to perform other tasks, such as executing instructions or performing calculations.

The DMA controller may transfer information between peripheral device components that are external or internal to the electronic device. For example, peripheral devices may include memory devices such as hard disk drives, compact disk (CD) drives, digital video disk (DVD) drives, memory cards, and other devices capable of storing information. Peripheral devices may further include universal asynchronous receiver/transmitters (UARTs), audio interfaces, universal serial bus (USB) interfaces, and other devices capable of processing, transferring, or storing information.

A peripheral device normally includes a buffer, which is a memory storage device used to temporarily store information. The DMA controller fills the peripheral device's buffer with information from the electronic device's main memory or another peripheral device. The peripheral device then processes, stores, or transmits the information in the buffer, eventually sending a request to the DMA controller when more information is needed to fill the buffer. The DMA controller may also transfer information from the peripheral device's buffer to the electronic device's main memory or another peripheral device.

If the peripheral device takes an amount of time to process, store, or transmit the information, the DMA controller has to wait the amount of time before filling the peripheral device's buffer with more information or retrieving information from the buffer. While the DMA controller waits to fill or empty the peripheral device buffer, an active power and clock signal are transmitted to the idle DMA controller. A communication bus may transfer information between the DMA controller and the peripheral device. An active power and clock signal may also be transmitted to the communication bus while the DMA controller is idle. Thus, the DMA controller and the communication bus may consume power even when the DMA controller and the communication bus are not interacting with the peripheral device.

DMA systems are present in electronic devices such as portable computers, portable music players, cellular telephones, personal digital assistants (PDAs), portable gaming devices, and other devices dependent on battery power. Reducing the consumption of power allows battery powered portable electronic devices to operate for longer periods without recharging the batteries. Thus, it would be beneficial to reduce power consumption by making the DMA controller inactive when the controller is not interacting with a peripheral device. It would also be beneficial to reduce power consumption by other components of the DMA system that are idle when no DMA transfer occurs.

SUMMARY OF THE INVENTION

The problems noted above are solved by an apparatus comprising a control module, a memory access device coupled to the control module, an information source coupled to the memory access device, and an information destination coupled to the memory access device. The memory access device, which may be a DMA controller, is capable of entering a power saving state. The DMA controller enters the power saving state if all DMA channels are disabled, no new DMA requests are received, and the DMA controller does not need to perform a read request or a write request.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection via other devices and connections. Furthermore, the term "information" is intended to refer to any data, instructions, or control sequences that may be communicated between components of the device. For example, if information is sent between two components, data, instructions, control sequences, or any combination thereof may be sent between the two components.

DETAILED DESCRIPTION OF THE EMBODIMENTS

In accordance with some embodiments of the invention, in an electronic device, a DMA controller couples to a peripheral device and a memory storage device. The DMA controller may transfer information between the peripheral device and the memory storage device through a DMA channel and an interconnect module. The DMA controller may enter standby mode when the DMA controller no longer interacts with the peripheral device or the memory storage device. Thus, the DMA controller may enter standby mode when no DMA channels are active, no DMA requests have been sent, and there is no information to be transferred by the DMA controller. Power and a clock signal may be limited or removed from the DMA controller in standby mode, thereby reducing power consumption in the electronic device.

The standby mode is described in detail in the copending, commonly assigned patent application "Standby Mode for Power Management" by Dahan, et al., Ser. No. 11/559,388, filed Nov. 13, 2006. Additionally, idle mode referenced below is described in detail in the copending, commonly assigned patent application "Idle Mode for Power Management" by Dahan, et al., Ser. No. 11/559,387, filed Nov. 13, 2006.

Figure 1:
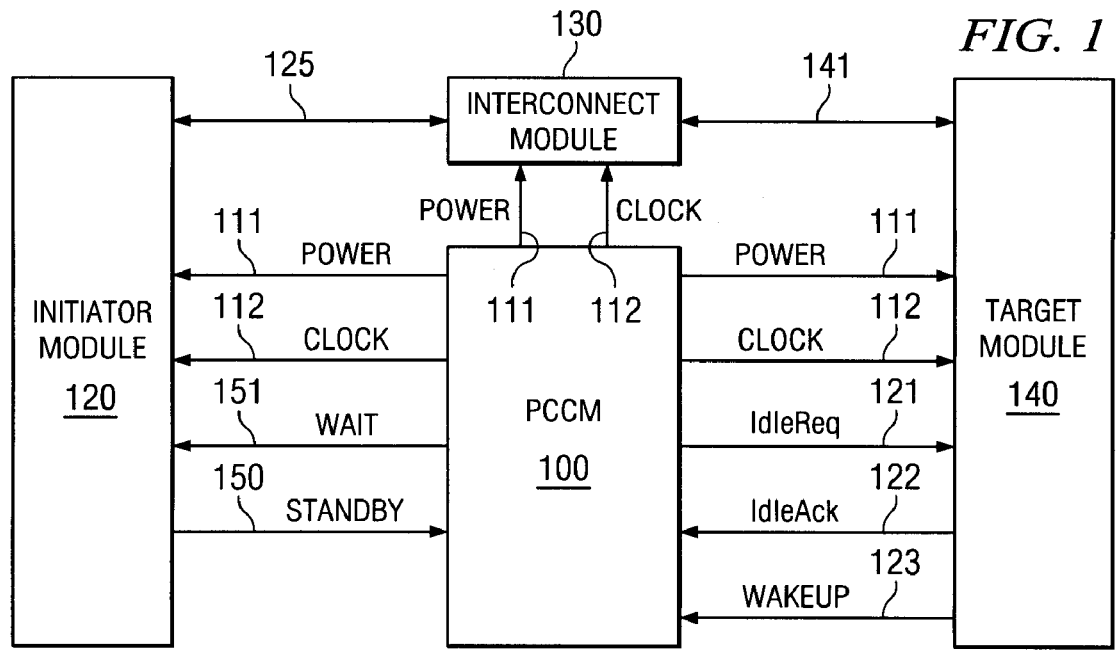
FIG. 1, in accordance with some embodiments of the invention, shows a power and clock control module (PCCM) coupled to an initiator module, interconnect module, and target module.

Referring to FIG. 1, a power and clock control module (PCCM) 100 couples to an initiator module 120, interconnect module 130, and target module 140. PCCM 100 provides power and a clock signal to each module through power line 111 and clock line 112. Power line 111 provides power to logic circuits in each module, and clock line 112 provides a clock signal to logic circuits in each module for control and synchronization. In some embodiments of the invention, clock line 112 may provide identical clock signals to each module, derived clock signals to each module, independent clock signals to each module, or multiple clock signals to each module from PCCM 100. In some embodiments of the invention, PCCM 100 may be capable of selectively turning on and off power and clock signals to initiator module 120, interconnect module 130, and target module 140.

In the electronic device shown in FIG. 1, interconnect module 130 couples to both initiator module 120 and target module 140. Interconnect module 130 may be any logic circuitry capable of routing information, such as data, instructions, and control sequences, from initiator module 120 to target module 140. Further, interconnect module 130 may communicate interrupts and DMA requests between target module 140 and initiator module 120. An interrupt is a signal that momentarily interrupts initiator module 120 processing and indicates to initiator module 120 that a predefined event has occurred within target module 140. The initiator module 120 may be a DMA controller, and a DMA request may be a request from the target module 140 to the DMA controller that is initiator module 120 to transfer information to the target module.

Interconnect module 130 may be a bus, which may be described as a set of conductors for communication between initiator modules and target modules of the electronic device. Interconnect module 130 may be an interconnection network, which is a collection of buses connected together to form a mesh with nodes at the bus intersections, the buses including logic circuitry that can route information from one module to another module. Further, interconnect module 130 may be any other device capable of routing information between modules.

Initiator module 120 is any logic circuitry within an electronic device that generates write or read requests. Initiator module 120 may be a processor, direct memory access (DMA) controller, digital signal processor (DSP), video accelerator, peripheral device, or any other type of device capable of initiating write or read requests. Initiator module 120 connects to interconnect module 130 through connection 125.

Target module 140 is any logic circuitry that is the destination of a write or read request. Target module 140 may be a memory device, such as a register, cache, external or internal static random access memory (SRAM) or dynamic random access memory (DRAM), or a peripheral device, such as a display device or an external hard drive. Interconnect module 130 connects to target module 140 through connection 141.

Initiator module 120, for example, may be a DMA controller capable of transferring information from a memory device (not shown in FIG. 1) to target module 140, which may be a peripheral device, such as an external hard drive. When initiator module 120 generates a write request to the external hard drive that is target module 140, interconnect module 130 coordinates the request to the external hard drive. In some embodiments of the invention, multiple initiator modules 120 and target modules 140 may be present and interconnect module 130 may serve to coordinate the flow of information between the modules.

Modules in an electronic device may include circuitry which are not contiguously placed next to each other but rather distributed throughout the device. Thus, the initiator module 120, interconnect module 130, and target module 140 shown in FIG. 1 may be considered a logical partitioning of the circuits on an electronic device rather than a physical partitioning. For example, consider a chip containing the circuitry for a processor and a cache. The processor circuitry may be located on different parts of the chip and contiguous to or mixed in with the cache circuitry. Circuitry for the processor may be logically grouped into an initiator module and the circuitry for the cache may be logically grouped into a target module. Similarly, the chip may contain bus circuitry that is distributed along different parts of the chip and which connects the processor circuitry and cache circuitry. The bus circuitry may be logically grouped into an interconnect module.

When initiator module 120 no longer initiates read or write requests to target module 140, PCCM 100 may deactivate or limit power and the clock signal transmitted to initiator module 120 to reduce power consumed by logic circuitry in initiator module 120. Thus, initiator module 120 may enter a standby mode in which it consumes less power and may not use the clock signal. Initiator module 120 may exit standby mode if a read or write request needs to be initiated to other components of the device. To exit standby mode, initiator module 120 informs PCCM 100 to activate the power and the clock signal.

In some embodiments of the invention, as described above, initiator module 120 may detect when it may be able to enter standby mode. Initiator module 120 communicates to PCCM 100 that initiator module 120 is ready to enter standby mode under conditions as described below. For instance, initiator module 120 may detect that no read or write requests have been initiated over a number of clock cycles. Initiator module 120 may then communicate to PCCM 100 by activating a standby signal through a standby line 150 as shown in FIG. 1. Once initiator module 120 activates the standby signal, initiator module 120 may no longer initiate requests to target module 140. Initiator module 120 enters standby mode after PCCM 100 activates the wait signal to initiator module 120 through wait line 150.

When initiator module 120 enters standby mode, PCCM 100 may reduce or eliminate power sent to initiator module 120 and turn off the clock signal transmitted to initiator module 120. Alternatively, PCCM 100 may reduce the frequency of the clock signal. Thus, initiator module 120 may utilize the clock signal while reducing power consumption. Power and clock signals to interconnect module 130 and target module 140 may also be removed. In some embodiments of the invention, PCCM 100 may reduce or eliminate power to initiator module 120 and turn off the clock signal to initiator module 140 once initiator module 120 enters standby mode and other modules capable of generating DMA requests are idle.

If an event wakes up initiator module 120 from standby mode, initiator module 120 deactivates the standby signal. However, PCCM 100 may not deactivate the wait signal until the power and clock signals to initiator module 120, interconnect module 130, and target module 140 from PCCM 100 reach steady state operating conditions. Only after the clock and power signals have reached steady state and PCCM 100 has deactivated the wait signal does initiator module 120 exit standby mode and resume normal operation. In some embodiments of the invention, initiator module 120 may not execute instructions or initiate requests to target module 140 until PCCM 100 deactivates the wait signal. In some other embodiments of the invention, initiator module 120 may be designed to operate in a low power or low clock frequency environment during standby mode to perform "background" processing.

When initiator module 120 enters standby mode, PCCM 100 may deactivate or limit the power and the clock signal transmitted to target module 140 to reduce the power consumed by the logic circuitry in target module 140. Thus, the target module may enter an idle mode in which it consumes less power and may not use one or more clock signals from PCCM 100. If multiple initiator modules connect to PCCM 100 and interconnect module 130, PCCM 100 may deactivate or limit the power and the clock signal to target module 140 if all initiator modules are in standby mode that are capable of sending requests to target module 120. Target module 140 may exit idle mode if initiator module 120 exits standby mode or target module 140 needs to interrupt or communicate with initiator module 120.

For target module 140 to enter idle mode, PCCM 100 first activates an IdleReq signal to target module 140 through an IdleReq line 121 when initiator module 120 enters standby mode. If the IdleReq signal is active and target module 140 does not need to transmit an interrupt or communicate with initiator module 120, an IdleAck signal is activated to PCCM 100 through an IdleAck line 122. Once the IdleAck signal is activated, target module 140 may be in idle mode and may no longer transmit interrupt signals or communicate with initiator module 120. When PCCM 100 receives the IdleAck signal, PCCM 100 may reduce or eliminate power sent to target module 140 and turn off one or more clock signals transmitted to target module 140, depending on the level of target module 140 functionality in idle mode. Alternatively, PCCM 100 may reduce the frequency of the one or more clock signals to target module 140. Thus, target module 140 may utilize the one or more clock signals while reducing power consumption.

Target module 140 may not communicate with any modules in the device other than PCCM 100 while in idle mode. If target module 140 needs to communicate with other components of the device, target module 140 must exit idle mode before any communication may occur. If a condition which may cause target module 140 to wakeup from idle mode occurs, as described below, target module 140 may activate a wakeup signal to PCCM 100 through a wakeup line 123. After PCCM 100 receives the wakeup signal, PCCM 100 returns the power and clock signals to steady state operating conditions. PCCM 100 then deactivates the IdleReq signal, and target module 140 deactivates the IdleAck signal and exits idle mode.

Target module 140 may also wakeup from idle mode if initiator module 120 exits standby mode. Thus, PCCM 100 returns the power and clock signals to steady state operating conditions and deactivates the IdleReq signal. Target module 140 may then receive and process requests from initiator module 120.

If all initiator modules and target modules connected to the interconnect module 130 are in standby mode or idle mode, respectively, the interconnect module 130 may enter a power saving mode because the interconnect module 130 may not have information to transmit. In power saving mode, PCCM 100 may deactivate or limit power and the clock signal transmitted to the interconnect module 130. PCCM 100 may activate power and the clock signal to interconnect module 130 if an initiator module 120 or target module 140 exits standby mode or idle mode, respectively.

This technique of placing initiator module 120 in standby mode, target module 140 in idle mode, and interconnect module 130 in power saving mode may reduce power consumption within the electronic device. For example, while the amount of power saved each time a target module 140 enters idle mode may not be significant, the cumulative effect of power saved over time with target module 140 in idle mode may be considerable. Because multiple initiator modules 120, interconnect modules 130, and target modules 140 may be present in the device, standby mode in the initiator module, idle mode in the target module and power saving mode in the interconnect module may save significant amounts of power. Thus, standby mode, idle mode, and power saving mode allow battery powered devices, such as laptop computers, portable music players, cellular telephones, personal digital assistants (PDA), and other portable electronic devices, to reduce power consumption and increase battery life.

Figure 2:
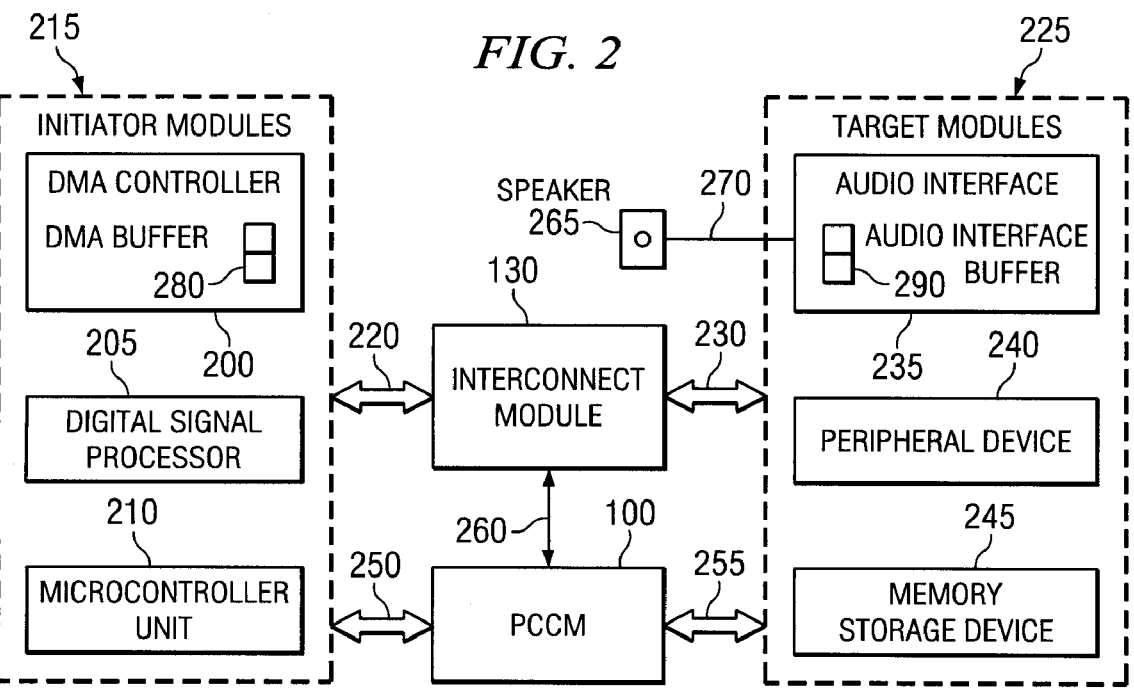
FIG. 2, in accordance with some embodiments of the invention, shows a PCCM coupled to initiator modules, an interconnect module, and target modules.

As described above, a direct memory access (DMA) controller may transfer information between components in an electronic device. A DMA controller may be an initiator module because it initiates read and write requests to components in the electronic device. As shown in FIG. 2, initiator modules 215 may be a DMA controller 200, digital signal processor (DSP) 205, and microcontroller unit (MCU) 210. The initiator modules 215 connect to interconnect module 130 through bus 220. Interconnect module 130 also connects to target modules 225 through bus 230. The target modules 225 may be an audio interface 235, peripheral device 240, and memory storage device 245.

PCCM 100 couples to the initiator modules 215, interconnect module 130, and target modules 225. PCCM 100 connects to each initiator module through a power line, a clock line, a wait line, and a standby line. These lines connecting PCCM 100 to each initiator module are not shown in FIG. 2 but resemble power line 111, clock line 112, wait line 151, and standby line 150 shown in FIG. 1. The power line, clock line, wait line, and standby line connecting PCCM 100 to the initiator modules 215 are represented by bus 250. As described above, each initiator module is capable of entering standby mode.

PCCM 100 couples to each target module through a power line, clock line, IdleReq line, IdleAck line, and wakeup line. These lines connecting PCCM 100 to each target module are not shown in FIG. 2 but resemble the power line 111, clock line 112, IdleReq line 121, IdleAck 122, and wakeup line 123 shown in FIG. 1. The power line, clock line, IdleReq line, IdleAck line, and wakeup line connecting PCCM 100 to the target modules 225 are represented by bus 255. As described above, each target module is capable of entering idle mode.

PCCM 100 also connects to interconnect module 130 through a power line and a clock line. The power line and clock line are represented by bus 260. Power and the clock signal may be removed from interconnect module 130 if the initiator modules 215 and target modules 225 shown in FIG. 2 enter standby mode or idle mode, respectively, and no longer transfer information through interconnect module 130. Bus 260 may also include an IdleReq line and an IdleAck line connecting interconnect module 130 and PCCM 100. Thus, interconnect module 130 may be capable of entering idle mode.

In some embodiments of the invention, a large amount of audio data may be stored in memory storage device 245. The audio data may be sent to audio interface 235 as described below to be further transferred to a speaker 265 through connection 270. Audio interface 235 contains an audio interface buffer 290. Audio interface 235 transfers audio information stored in audio interface buffer 290 to speaker 265. In some embodiments of the invention, audio circuitry (not shown in FIG. 2) capable of manipulating audio information may couple between audio interface 235 and speaker 265. In some other embodiments of the invention, audio interface 235 may connect to a microphone (not shown) and may transfer audio information from the microphone to memory storage device 245 using DMA controller 200.

When transferring audio information from memory storage device 245 to audio interface 235, microcontroller unit 210 instructs DMA controller 200 to transfer the audio information to the audio interface 235. DMA controller 200 then reads information from memory storage device 245, stores the information in a DMA buffer 280, and writes the information to audio interface buffer 290. DMA controller 200 transfers information to audio interface 235 through a DMA channel (not shown) through interconnect module 130. Thus, the DMA channel is an information path from DMA controller 200 to audio interface 235 or another target module. Multiple DMA channels may be present in the system shown in FIG. 2. In some embodiments of the invention, DMA channels may be directly connected between DMA controller 200 and target modules 225. In some other embodiments of the invention, DMA channels may connect to target modules 225 through interconnect module 130.

The audio information to be transferred to audio interface 235 may be larger than the storage capacity of audio interface buffer 290. Therefore, DMA controller 200 fills audio interface buffer 290 with audio information from memory storage device 245. Audio interface 235 then transfers the audio information to speaker 265. When audio interface buffer 290 needs more audio information, audio interface 235 sends a communication to DMA controller 200. When DMA controller 200 receives the communication, DMA controller 200 may transfer more audio information to audio interface buffer 290.

The output rate of DMA controller 200 is usually much higher than the output rate of the audio interface. This is because audio interface 235 may take a long period of time to transfer audio information from audio interface buffer 290 to speaker 265. During this time, DMA controller 200 may be waiting to fill audio interface buffer 290. In order to conserve power, DMA controller 200 may enter standby mode when it is not active. PCCM 100 may reduce or eliminate power to DMA controller 200 and turn off the clock signal transmitted to logic circuitry in DMA controller 200.

To request entry into standby mode, DMA controller 200 may activate the standby signal. When the standby signal is active, DMA controller 200 may detect a wakeup event, such as a DMA request from the microcontroller unit or communication from a target module, and respond after deactivating the standby signal. After PCCM 100 activates the wait signal to DMA controller 200, PCCM 100 enters idle target modules 225 into idle mode. PCCM 100 may remove power and the clock signal to some or all of the logic circuitry in DMA controller 200, placing the DMA controller 200 into standby mode. Interconnect module 130 and target modules 225 power consumption may be reduced similarly. DMA controller 200 may exit standby mode if it detects a DMA request or other communication. For example, microcontroller 210 may instruct DMA controller 200 to transfer information or communication from the audio interface may be received, thus waking DMA controller 200 from standby mode.

When audio interface buffer 290 is almost empty, audio interface 235 may send a wakeup event to PCCM 100 to resume power and the clock signal to audio interface 235 and interconnect module 130. Audio interface 235 exits idle mode and may send a communication to DMA controller 200 through interconnect module 130. As described above, DMA controller 200 may exit standby mode and fill audio interface buffer 290. Once DMA controller 200 fills audio interface buffer 290 and no longer initiates read or write requests, DMA controller 200 may return to standby mode. This process continues until all the audio information is transferred from memory storage device 245 to audio interface 235.

Figure 3:
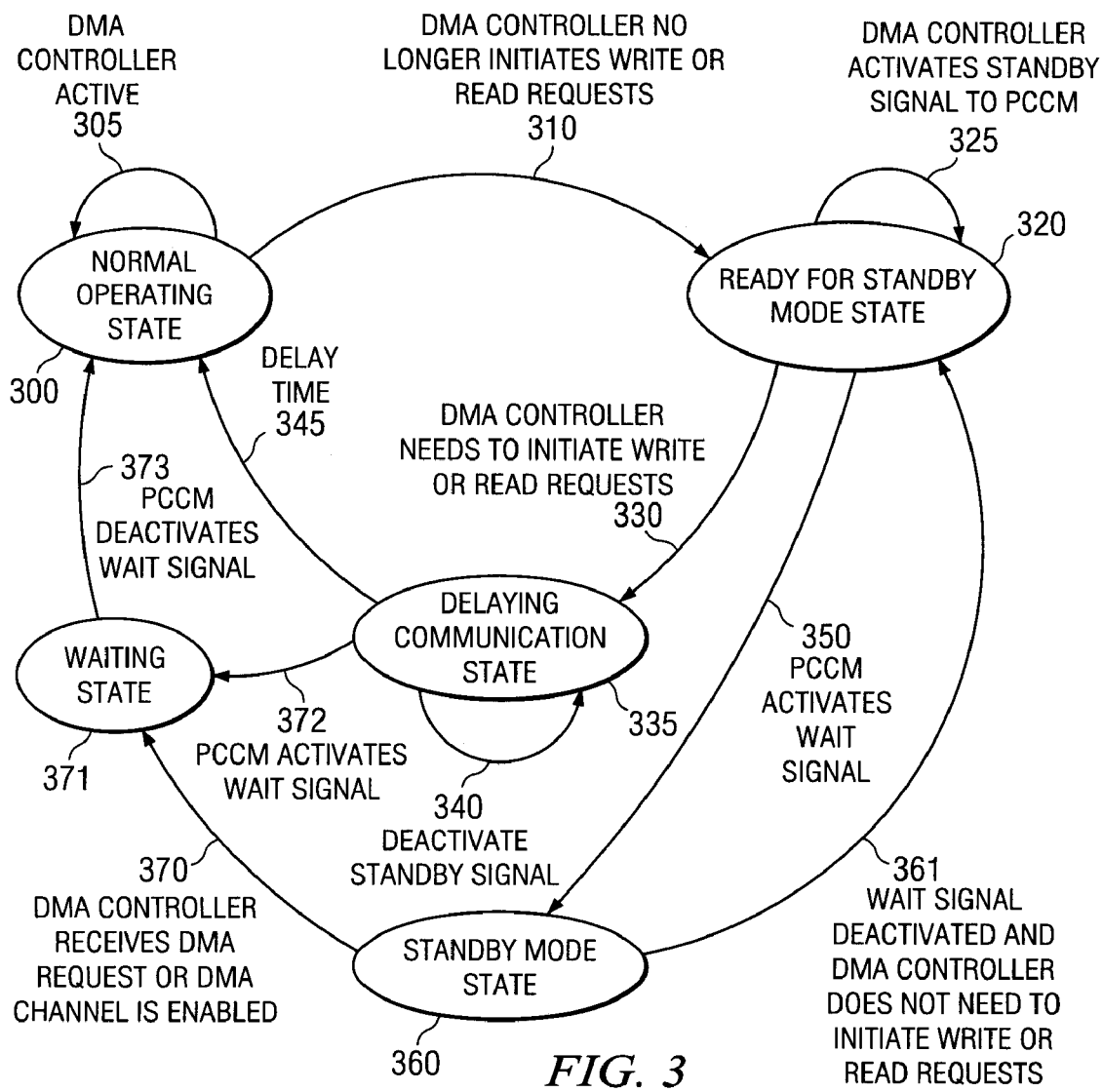
FIG. 3 shows a state diagram with the states for standby mode in a DMA controller in accordance with some embodiments of the invention.

Turning now to FIG. 3, a state diagram describing standby mode in DMA controller 200 includes the following states: normal operating state 300, ready for standby mode state 320, delaying communication state 335, standby mode state 360, and waiting state 371. In normal operating state 300, DMA controller 200 is active 305 and may initiate write or read requests to target modules 225. When no DMA requests or other communications have been received and DMA controller 200 has no active DMA channels and no longer initiates write or read requests 310, DMA controller 200 may enter ready for standby mode state 320.

In ready for standby mode state 320, DMA controller 200 activates the standby signal to PCCM 325. Once the standby signal has been activated, DMA controller 200 may no longer communicate with target modules 225. If DMA controller 200 needs to initiate write or read requests 330 to target modules 225, DMA controller 200 may enter a delaying communication state 335 and deactivate the standby signal 340. In ready for standby mode state 320, for instance, DMA controller 200 may receive a communication from audio interface 235, thus indicating that the DMA controller 200 should wake up, exit standby mode, and transfer information to audio interface 235. DMA controller 200 may transition to delaying communication state 335 if microcontroller 210 instructs DMA controller 200 to transfer information. DMA controller 200 then deactivates the standby signal 340. Furthermore, in delaying communication state 335, DMA controller 200 may perform processing related to the received DMA request from microcontroller unit 210 or communication with audio interface 235. However, DMA controller 200 may not communicate with other modules in the device other than PCCM 100 for a variable amount of time in accordance with the embodiments of the DMA controller. Once the delay time 345 passes and the wait signal is not asserted, DMA controller 200 may enter normal operating state 300. If PCCM 100 activates the wait signal 372 after the standby signal has been deactivated 340, the DMA controller may enter waiting state 371. DMA controller 200 may then transition to normal operating state 300 after PCCM 100 deactivates the wait signal 373.

In ready for standby mode state 320, DMA controller 200 activates the standby signal to PCCM 325. If PCCM 100 activates the wait signal 350, DMA controller 200 may enter standby mode state 360. PCCM 100 may reduce or eliminate the power and the clock signal to circuitry in DMA controller 200, and the DMA controller 200 may remain in standby mode state 360 until a read or write request is to be initiated. In some embodiments of the invention, PCCM 100 may deactivate the wait signal when DMA controller 200 is in standby mode state 360. If DMA controller 200 does not need to initiate read or write requests 361, DMA controller 200 enters ready for standby mode state 320.

If DMA controller 200 receives a DMA request from microcontroller 210, communication from a target module, or a DMA channel is enabled 370, DMA controller 200 may exit standby mode state 360 and enter waiting state 371. DMA controller 200 may enter normal operating state after PCCM 100 deactivates wait signal 373. The wait signal may not be deactivated until power and the clock signal stabilize to a steady state level for normal DMA controller 200 operation. Only after the wait signal has been deactivated 370 may DMA controller 200 exit standby mode state 360 and enter normal operating state 300. In some embodiments of the invention, DMA controller 200 may not start processing related to initiating write or read requests until PCCM 100 deactivates the wait signal. In some other embodiments, DMA controller 200 may start processing related to initiating write or read requests before the PCCM 100 deactivates the wait signal if the necessary power and clock signal are active. DMA controller 200 may not communicate with target modules 225 until the wait signal is deactivated and the DMA controller 200 enters normal operating state 300.

Returning to FIG. 2, in some embodiments of the invention, while DMA controller 200 transfers audio information to audio interface 235, other components shown in FIG. 2 may enter power saving states if they are inactive. As described above, microcontroller unit 210 and digital signal processor 205 are capable of entering standby mode, and peripheral device 240 and memory storage device 245 and interconnect module 130 are capable of entering idle mode. In the audio information example above, DMA controller 200 may transfer audio information from memory storage device 245 to audio interface 235. DSP 205 and MCU 210 may be inactive and may enter standby mode. Peripheral device 240 and memory storage device 245 may enter idle mode if conditions described above are met.

Figure 4:
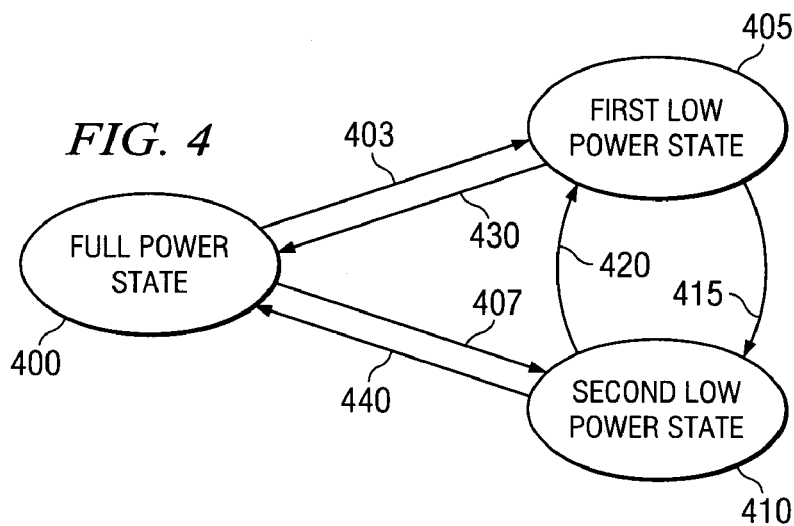
FIG. 4 shows a state diagram of the system shown in FIG. 2 in accordance with some embodiments of the invention.

In some embodiments of the invention, when DMA controller 200 transfers audio information to audio interface buffer 290, DMA controller 200, audio interface 235, interconnect module 130, memory storage device 245, and PCCM 100 may be active and receiving power and clock signals. In these embodiments, the remaining modules in FIG. 2 may enter power saving states. As shown in FIG. 4, such embodiments of the invention may be described as a first low power state 405 of the system of FIG. 2.

In some embodiments of the invention, after DMA controller 200 fills audio interface buffer 290, DMA controller 200 may become inactive and enter standby mode. MCU 210 and DSP 205 may remain in standby mode if inactive, peripheral device 240 may remain in idle mode, and memory storage device 245 and interconnect module 130 may enter idle mode. Audio interface 235 may enter idle mode because audio interface 235 is not interacting with any modules in the device other than speaker 265. Thus, PCCM 100 may reduce or eliminate power and the clock signal to logic circuitry in audio interface 235 responsible for communicating with initiator modules 215, interconnect module 130, and memory storage device 245. However, PCCM 100 may still supply power and the clock signal to the logic circuitry in audio interface 235 responsible for transferring audio information to speaker 265. PCCM 100 remains active in this state and may reduce or eliminate power and the clock signal to interconnect module 130 if no information needs to transfer. As shown in FIG. 4, such embodiments of the invention as described above may be a second low power state 410 of the system of FIG. 2.

In some embodiments of the invention, DMA controller 200 may exit standby mode when a DMA channel is enabled. For example in FIG. 2, DMA controller 200 may be in standby mode while waiting for audio interface 235 to empty audio interface buffer 290. If information needs to transfer from peripheral device 240 to memory storage device 245, DMA controller 200 may exit standby mode, enable a DMA channel to peripheral device 240 and memory storage device 245, and transfer information from peripheral device 240 to memory storage device 245. DMA controller 200 may contain multiple DMA buffers (not shown in FIG. 2) for transferring information between different components of the device. DMA controller 200 may also enter standby mode if DMA controller 200 no longer interacts with modules other than PCCM 100.

Turning now to FIG. 4, a state diagram for the system shown in FIG. 2 including a full power state 400, first low power state 405, and second low power state 410 is shown. In full power state 400, all or most of the components shown in FIG. 2 are active. For example, when a user turns on a device, such as a cellular telephone or a portable music player, the device may enter full power state 400. The user may select a song to play, and after MCU/DSP has processed all or a sufficient amount of audio data, the device transitions 403 to first low power state 405 as described in detail above. In first low power state 405, DMA controller 200 fills audio interface buffer 290 with audio information from memory storage device 245. MCU 210, DSP 205, and peripheral device 240 may enter power saving states if inactive.

After DMA controller 200 fills audio interface buffer 290 with audio information, the device transitions 415 to second low power state 410. In second low power state 410, audio interface 235 transmits the audio information stored in audio interface buffer 290 to speaker 265. DMA controller 200 may be inactive and thus may enter standby mode. PCCM 100 may eliminate or reduce power and the clock signal to interconnect module 130. Further, memory storage device 245, peripheral device 240, and audio interface 235, as described above, may enter idle mode. Once audio interface buffer 290 is to be filled, audio interface 235 sends a wakeup event to PCCM 100, exits idle mode, and may send a communication to DMA controller 200. Thus, DMA controller 200 exits standby mode and the device transitions 420 to first low power state 405. DMA controller 200 fills the audio interface buffer 290 and the system returns to second low power state 410. In some embodiments of the invention, the device may transition 407 from full power state 400 to second low power state 410 if, for example, components in the device enter standby or idle mode as DMA controller 200 enters standby mode.

The electronic device transitions (415, 420) between first low power state 405 and second low power state 410 until all audio information is transferred to speaker 265 from memory storage device 245. When more data is required, the system goes back to full power state so that the MCU/DSP can process more data. The device may exit (430, 440) from first low power state 405 or second low power state 410 at any time and return to full power state 400. For example, a user may select a different song on the portable music player or activate an additional function, thus exiting the device from a low power state. Also, additional power states may exist in which components enter power saving states over different sequences of state transitions.

In some embodiments of the invention, MCU/DSP audio data processing and DMA transfer are high speed operations. Transferring audio information to the speaker may be the slowest operation in the audio interface example detailed above. Thus, power may be conserved and the device may spend a significant amount of time in second low power state 410.

Referring back to FIG. 2, in some embodiments of the invention, DMA controller 200 may use the same power and clock signals as interconnect module 130. Thus, DMA controller 200 and interconnect module 130 may share a power and clock connection (not shown in FIG. 2). When DMA controller 200 is no longer active and no initiator modules 215 or target modules 225 are sending information to interconnect module 130, PCCM 100 may reduce or eliminate power and clock signal to interconnect module 130 and DMA controller 200.

As described above, DMA controller 200 holds information in DMA buffer 280 that is sent to a peripheral device such as audio interface 235. DMA controller 200 may also store information relating to the state of the controller, such as the address of information to be transferred and the destination of the information. If DMA controller 200 contains memory storage such as static random access memory (SRAM), the contents of DMA controller 200 may be lost if power is removed. Thus, DMA controller 200 may contain retention registers or other memory storage devices capable of storing information when PCCM 100 removes power from DMA controller 200. A retention register is described in detail in patent application "Retention Register with Normal Functionality Independent of Retention Power Supply" by Ko, et al., Ser. No. 10/613,271, filed Jul. 3, 2003. Thus, PCCM 100 may stop power to DMA controller 200 in standby mode without losing the memory contents stored in DMA controller 200.

As shown in FIG. 2, standby mode may be implemented in an electronic device containing a DMA controller. Thus, power consumption by devices containing DMA controllers may be reduced, thereby allowing battery powered portable electronic devices containing DMA controllers to operate for longer periods without recharging batteries.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   A. a control module having power outputs, clock outputs, a wait output, a standby input, an idle request output, an idle acknowledgement input, and a wakeup input;
   B. an initiator module that generates write or read requests on interconnect leads, the initiator module having a power input connected to a power output of the control module, a clock input connected to a clock output of the control module, a wait input connected to the wait output of the control module, and a standby output connected to the standby input of the control module; and
   C. a target module that receives write or receive requests from the initiator module on interconnect leads, the target module having a power input connected to a power output of the control module, a clock input connected to a clock output of the control module, an idle request input connected to the idle request output of the control module, an idle acknowledgement output connected to the idle acknowledgement input of the control module, and a wakeup output connected to the wakeup input of the control module.

2. The apparatus of claim 1 in which the control module sends a wait signal to the initiator module in response to receiving a standby signal from the initiator module.

3. The apparatus of claim 1 in which the control module sends a wait signal to the initiator module in response to receiving a standby signal from the initiator module, and the control module reduces power and a clock signal to the initiator module.

4. The apparatus of claim 1 in which the target module sends an idle acknowledgement signal to the control module in response to receiving an idle request signal from the control module.

5. The apparatus of claim 1 in which the target module sends an idle acknowledgement signal to the control module in response to receiving an idle request signal from the control module, and the control module reduces power and a clock signal to the target module.

6. The apparatus of claim 1 in which the target module sends a wakeup signal to the control module to bring the power and clock signal to a steady state operating condition.

7. The apparatus of claim 1 including an interconnect module that connects together the interconnect leads of the initiator module and the target module, and that is connected to a power output and a clock output of the control module.

8. The apparatus of claim 1 in which the initiator module is one of a direct memory access controller, a digital signal processor, a processor, and a video accelerator.

9. The apparatus of claim 1 in which the target module is one of a memory device and an peripheral device.

10. A process of operating a system comprising:
    A. generating write and read requests from an initiator module;
    B. receiving write and read request by a target module;
    C. selectively providing power and clock signals to the initiator module and the target module;
    D. activating a wait signal from the control module to the initiator module and reducing the power and clock signal to the initiator module in response to receiving an active standby signal from the initiator module;
    E. activating an idle request signal to the target module after reducing power and clock signal to the initiator module; and
    F. receiving an active idle acknowledgment signal from the target module, in response to the active idle request signal, and reducing the power and clock signal to the target module.

11. The process of claim 10 in which reducing the power and clock signal to the initiator module includes reducing the frequency of the clock signal.

12. The process of claim 10 in which reducing the power and clock signal to the initiator module includes removing the power and clock signal.

13. The process of claim 10 in which reducing the power and clock signal to the target module includes reducing the frequency of the clock signal.

14. The process of claim 10 in which reducing the power and clock signal to the target module includes removing the power and clock signal.

15. The process of claim 10 including deactivating the standby signal from the initiator module to the control module, and deactivating the wait signal from the control module after the power and clock signal to the initiator module reach steady state operating conditions.

16. The process of claim 10 including returning the power and clock signal to the target module to steady state operating conditions and deactivating the idle request signal in response to activating a wakeup signal from the target module to the control module.

* * * * *